United States Patent
Hombs et al.

(10) Patent No.: US 9,374,722 B1
(45) Date of Patent: Jun. 21, 2016

(54) INTERFERENCE REJECTION BASED MAXIMUM SINR PRE-FILTERING FOR MULTIUSER DETECTION IN AN LTE UPLINK

(71) Applicant: Collision Communications, Inc., Peterborough, NH (US)

(72) Inventors: Brandon Hombs, Merrimack, NH (US); Sayak Bose, Nashua, NH (US)

(73) Assignee: Collision Communications, Inc., Peterborough, NH (US)

( * ) Notice: Subject to any disclaimer, the term of this patent is extended or adjusted under 35 U.S.C. 154(b) by 2 days.

(21) Appl. No.: 14/583,079

(22) Filed: Dec. 24, 2014

(51) Int. Cl.
*H04B 1/00* (2006.01)
*H04W 24/02* (2009.01)
*H04L 25/03* (2006.01)

(52) U.S. Cl.
CPC ......... *H04W 24/02* (2013.01); *H04L 25/03006* (2013.01)

(58) Field of Classification Search
CPC   H04W 24/02; H04L 25/03006; H04B 1/0475
USPC ............ 455/73, 63.1, 501, 114.2, 296, 278.1; 375/346, 348
See application file for complete search history.

(56) References Cited

U.S. PATENT DOCUMENTS

| | | | |
|---|---|---|---|
| 8,937,884 B2 * | 1/2015 | Goldsmith | H04B 7/024 370/252 |
| 2004/0008803 A1 * | 1/2004 | Aldrovandi | H04L 25/0204 375/347 |
| 2005/0254600 A1 * | 11/2005 | Chen | H04L 27/0012 375/324 |

* cited by examiner

*Primary Examiner* — Tuan Pham

(57) ABSTRACT

Methods and systems for applying a multi-path, maximum SINR, pre-processing interference rejection filter to an interference-limited signal received from a plurality of users in a wireless network operating according to the Long Term Evolution ("LTE") standard includes receiving raw data, including training data from a plurality of users, selecting at least one modeled user, subtracting a contribution of the modeled user(s) from the training data to form a residual training signal, forming an interference rejection covariance matrix from the residual training signal, whitening the raw data using the interference rejection covariance matrix, and equalizing the whitened received data. In embodiments, an estimated contribution of a subset of the modeled users is subtracted from the raw data for filtering in a subsequent turbo loop. The subset can be selected based on an estimated post-combined SINR, an estimated outage capacity, or an estimated multiuser efficiency of the received data.

37 Claims, 3 Drawing Sheets

INTERFERENCE REJECTION BASED MAXIMUM SINR PRE-FILTERING FOR MULTIUSER DETECTION IN AN LTE UPLINK

FIELD

The subject matter disclosed relates to telecommunications, and more particularly, to methods of prefiltering received uplink data for non-linear multiuser detection in an LTE digital telecommunication network.

BACKGROUND

Various multiuser detection algorithms have been proposed to detect and distinguish simultaneous user data streams included in 3GPP long term evolution ("LTE") telecommunication uplinks. These approaches can be broadly categorized into linear and nonlinear multiuser detection.

Linear Multi-User Detection ("MUD") methods that are used for multiuser detection in an interference limited environment, such as an LTE uplink, include linear MMSE and Zero Forcing. Non-linear multiuser detection methods include MMSE, successive or parallel interference cancellation, and approximate Maximum Likelihood Detection ("MLD").

In particular, approximate MLD is an attractive nonlinear MUD algorithm because of its relatively low computational complexity and its superior performance. To improve its performance still further, MLD can be used in a turbo loop, wherein the initial equalization is based on a low complexity linear MMSE-IRC, Linear MMSE, or zero forcing equalizer.

Approaches to implementing approximate MLD have focused on formulating and evaluating its performance under the assumption that the modeled users are corrupted only by Additive White Gaussian Noise ("AWGN"). Accordingly, these approaches typically include a whitened, matched pre-filter stage, such as the Maximum Probability ("MAP") pre-filter 100 included in the receiver architecture of FIG. 1, which produces a maximum input signal to noise ratio for MLD when the residual noise is purely AWGN.

However, in practice uplink data also typically includes not Gaussian residual interference from users that are not modeled, and are therefore not taken into account during MLD. As a result, using only an AWGN-whitened matched pre-filter is not optimal in such cases, and can result in a decreased Signal to Interference and Noise Ratio ("SINR") and to degraded performance of the MLD.

Additionally, for the MLD algorithms that are typically applied to LTE uplink data, it can be difficult to distinguish between desired, significant users that should be modeled (e.g. high SINR users) and insignificant (e.g. low SINR) interfering users that should be suppressed. As a result, such MLD algorithms typically model low SINR users as well as high SINR users, and this can result in performance that is worse than if the low SINR users had been suppressed.

What is needed, therefore, is a method and system for applying a whitening, matched pre-filter to multi-user uplink data that produces a MLD input signal with maximum SINR even when the signals from modeled users are corrupted by residual interference from non-modeled users as well as AWGN.

SUMMARY

Accordingly, a method and system are described for applying a multi-path, maximum SINR, pre-processing interference rejection filter to an interference-limited signal received from a plurality of users in a wireless network operating according to the Long Term Evolution ("LTE") standard.

The method includes receiving raw data corresponding to transmission of signals from the plurality of users, said raw received data including training data corresponding to transmission of training signals from the plurality of users, selecting a modeled user according to a selection metric, subtracting a contribution of the modeled user from the training data to form a residual training signal, forming an interference rejection covariance matrix from the residual training signal, whitening the raw received data using the interference rejection covariance matrix to obtain whitened received data, and equalizing the whitened received data to obtain equalized received data.

According to exemplary embodiments, a plurality of modeled users is selected, of which a subset are deemed to be secondary users. Then the contribution of the secondary users to the raw received data is estimated from the equalized received data, and subtracted from the raw received data to obtain modified received data. In some of these embodiments, the method is repeated in a "turbo loop" until a pre-defined number of loop repetitions is reached, each repetition of the turbo loop being applied to the modified received data obtained by the preceding loop.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The accompanying drawings provide visual representations which will be used to more fully describe the representative embodiments disclosed here and can be used by those skilled in the art to better understand them and their inherent advantages. In these drawings, like reference numerals identify corresponding elements, and.

DETAILED DESCRIPTION

A method and system are described for applying a multi-path, maximum SINR, pre-processing interference rejection filter to an interference-limited signal received from a plurality of users in a wireless network operating according to the Long Term Evolution ("LTE") standard.

Figure 1:
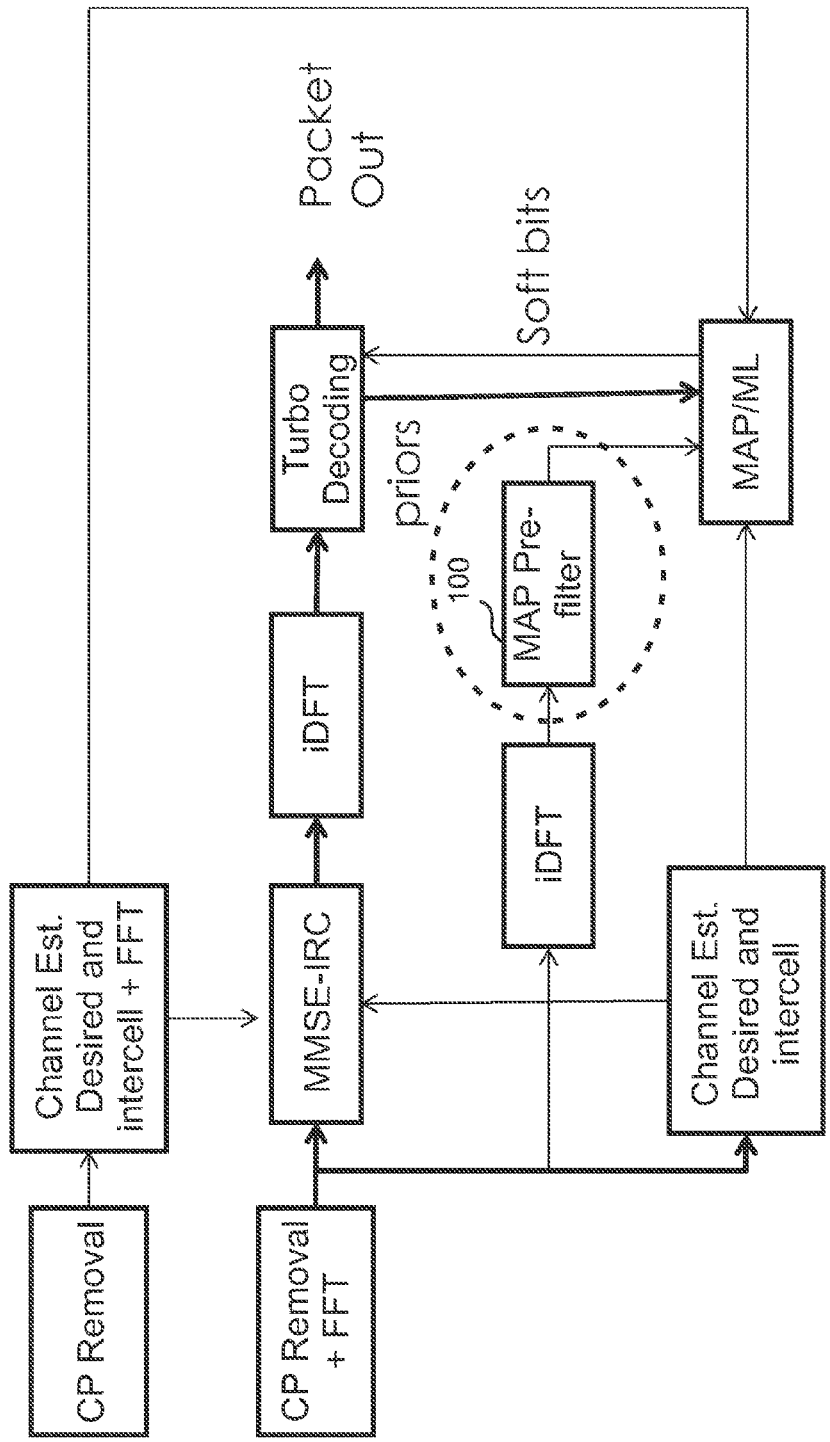
FIG. 1 is a functional diagram showing a typical MUD receiver that includes a Maximum-a-Posteriori ("MAP") pre-filter.
Figure 2:
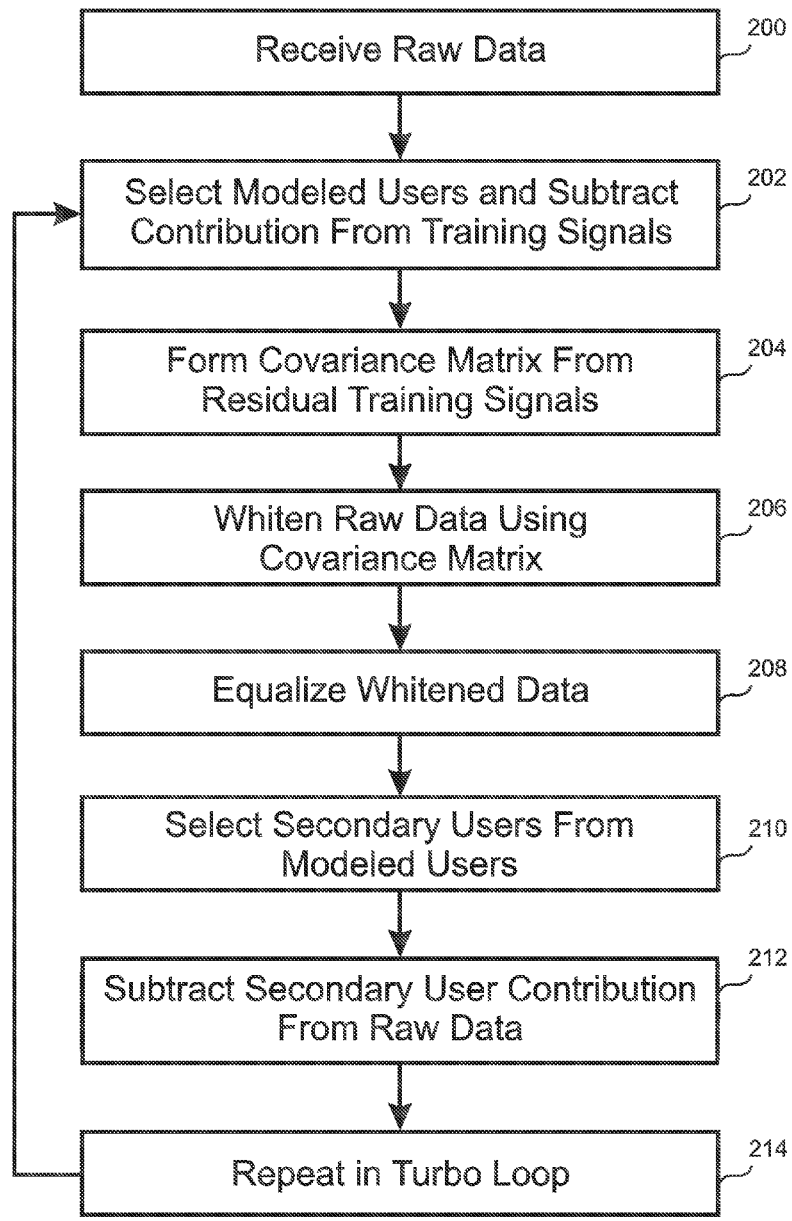
FIG. 2 is a flow diagram illustrating steps in an embodiment of the disclosed method.

With reference to FIG. 2, the method includes receiving raw data 200 corresponding to transmission of signals from the plurality of users, said raw received data including training data corresponding to transmission of training signals from the plurality of users. In embodiments, the training signals are SRS signals or DMRS signals. The method further comprises selecting at least one modeled user 202 according to a selection metric, subtracting a contribution of the modeled user(s) from the training data 202 to form a residual training signal, forming an interference rejection covariance matrix from the residual training signal 204, whitening the raw received data 206 using the interference rejection covariance matrix to obtain whitened received data, and equalizing the whitened received data 208 to obtain equalized received data.

In the embodiment of FIG. 2, a plurality of modeled users is selected, from which a subset are deemed to be secondary users 210. Then a contribution of the secondary users to the raw received data is estimated from the equalized received data, and the contribution is subtracted 212 from the raw received data to obtain modified received data. This subtraction can also include subtracting from the raw received data a contribution corresponding to an estimated average signal power of a data part of a signal received from at least one user that is not a secondary user.

In the embodiment of FIG. 2, the method is then repeated in a "turbo loop" 214 until a pre-defined number of loop repetitions is reached, each iteration of the loop being applied to the modified received data obtained by a preceding loop.

In exemplary embodiments that apply a turbo loop, the residual signal is obtained by (soft) remodulation of the equalized users' signal and carefully choosing one or more users to model in the subsequent turbo loop to equalize with MLD or a linear MMSE-IRC. The other users that are not modeled are suppressed by applying the Interference Rejection pre-filter ("IR filter").

The one or more modeled users are selected from the raw data 202 by applying a suitable metric, for example by choosing users with the highest post-combined SINR, outage capacity, and/or multiuser efficiency.

The residual interference signal is then formed by estimating a contribution of the modeled user(s) to the training data portion of the raw data, and subtracting the estimated contribution from the training data. This residual signal is then used to form a space-frequency or space-time covariance matrix 204 by averaging over sufficient carriers, corresponding to each multipath. The covariance matrix is then used to whiten the interference signal that is included in the raw data 206, which results in a maximum SINR for the users that are modeled in the MLD or linear MMSE-IRC detectors. Whitening the raw received data can include reshaping an effective composite channel covariance matrix to an upper triangular structure that is suitable for backward-forward type approximate maximum likelihood detection ("MLD").

This process of remodulation and interference cancellation can be repeated 214 for a pre-defined number of turbo loops, wherein the modeled users are selected from the training data in the first loop 202, and from the modified received data one or more of the subsequent loops.

After each turbo loop, the modeled users can be divided into a primary group of users to be modeled in the next turbo loop, and a secondary group of users to be suppressed in the next loop 210. This division of the modeled users can be based on an estimated post-combined SINR of the equalized received data, on an estimated outage capacity of the equalized received data, or on an estimated multiuser efficiency of the equalized received signal.

The method can further include detecting a plurality of user data streams from the received data using an algorithm that incorporates linear multiuser detection, linear Minimum Mean Square Error ("MMSE"), Zero Forcing, non-linear MMSE, successive interference cancellation, parallel interference cancellation, and/or approximate maximum likelihood detection ("MLD").

Note that the disclosed pre-processing filter, as illustrated for example in FIG. 2, is typically used to prepare data for analysis by an actual multiuser detector, such as a linear MMSE detector, an approximate MLD detector, or one of the other detectors mentioned above, and is typically not used by itself as a detector.

Note also that, in addition to providing maximum SINR at the input of an MLD detector by whitening the residual interference, embodiments of the present method also provide a convenient way of reshaping the composite channel using a Cholesky decomposition that is suitable for direct use with MLD. This is because the structures of the channel and of the interference covariance matrix are such that whitening of the interference matrix also reshapes the effective composite channel matrix to an upper triangular structure, which then can be used as the channel for backward-forward type reduced state MLD algorithms.

Figure 3:
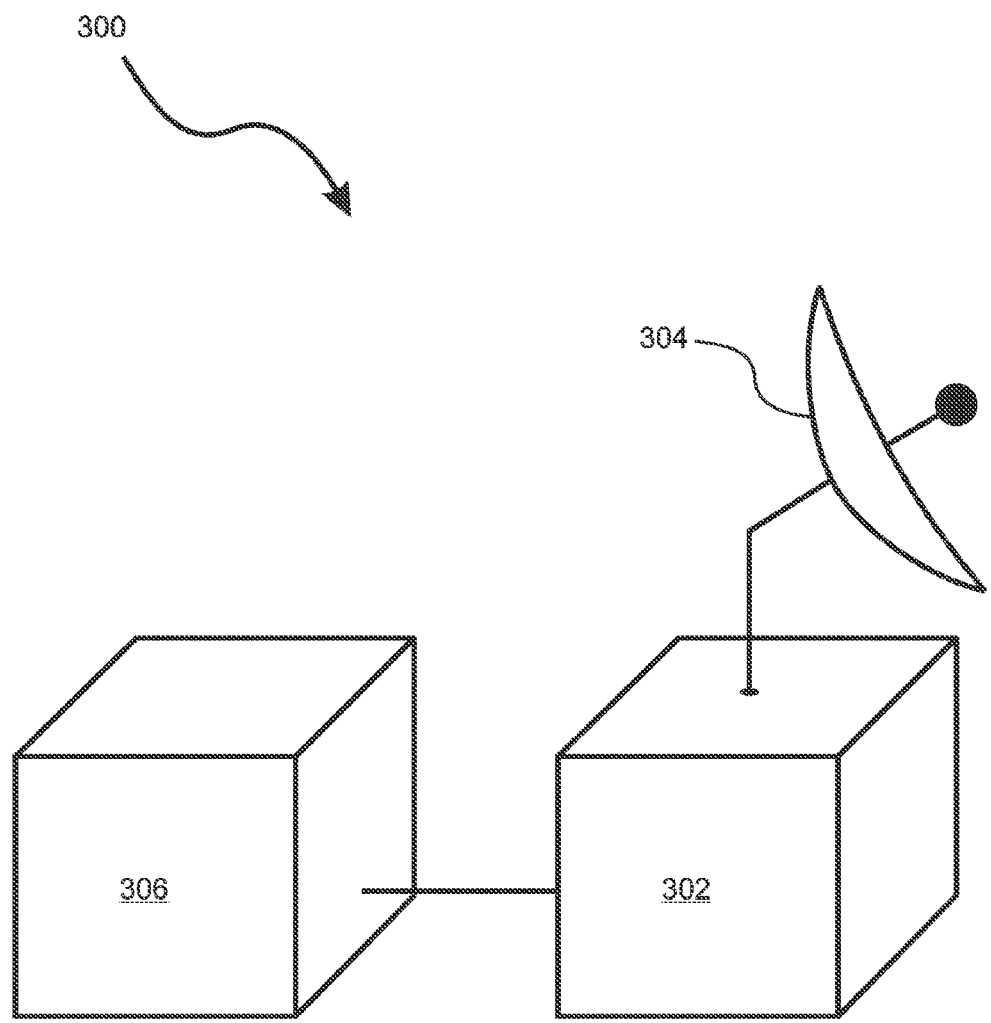
FIG. 3 is a block diagram illustrating an embodiment of the disclosed system.

With reference to FIG. 3, the system disclosed herein 300 includes a signal receiving unit 302 in communication with at least one antenna 304 and configured to receive raw data from a plurality of users, and a signal processing unit 306 that performs multi-user detection on the raw data using approximate Maximum Likelihood Detection ("MLD"), where the signal processing unit 306 includes an interference rejection pre-filter that produces an MLD input signal with maximum SINR even when the signals from modeled users are corrupted by residual interference from non-modeled users as well as AWGN.

The signal processing unit 306 is an instruction execution machine, apparatus, or device and may comprise one or more of a microprocessor, a digital signal processor, a graphics processing unit, an application specific integrated circuit (ASIC), a field programmable gate array (FPGA), and the like. The signal processing unit 306 may be configured to execute program instructions stored in a memory and/or data storage (both not shown). The memory may include read only memory (ROM) and random access memory (RAM). The data storage may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

The signal processing unit 306 and signal receiving unit 302 preferably detect and analyze transmissions from at least one or more remote nodes that operate in a networked environment using logical connections to one or more base stations ("BS's"). The remote node may be another BS, a user equipment ("UE"), a computer, a server, a router, a peer device or other common network node. The base station may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000®, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. Other examples of wireless networks include, for example, a BLUETOOTH network, a wireless personal area network, and a wireless 802.11 local area network (LAN).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, signal processing unit 306 may include logic configured to support direct memory access (DMA) transfers between memory and other devices.

It should be understood that the arrangement illustrated in FIG. 3 is but one possible implementation, and that other arrangements are possible. It should also be understood that the various system components (and means) defined by the claims, described above, and illustrated in the various block diagrams represent logical components that are configured to perform the functionality described herein. For example, one or more of these system components (and means) can be realized, in whole or in part, by at least some of the components illustrated in the arrangement of hardware device 300. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter disclosed, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method of applying a multi-path, maximum SINR, pre-processing interference rejection filter to an interference-limited signal received from a plurality of users in a wireless network operating according to the Long Term Evolution ("LTE") standard, the method comprising:
    receiving raw data corresponding to transmission of signals from the plurality of users, said raw received data including training data corresponding to transmission of training signals from the plurality of users;
    selecting a modeled user according to a selection metric;
    subtracting a contribution of the modeled user from the training data to form a residual training signal;
    forming an interference rejection covariance matrix from the residual training signal;
    whitening the raw received data using the interference rejection covariance matrix to obtain whitened received data; and
    equalizing the whitened received data to obtain equalized received data.

2. The method of claim 1, wherein said residual training signal includes a non-Gaussian contribution from at least one user that is not a modeled user.

3. The method of claim 1, wherein selecting a modeled user includes selecting a plurality of modeled users.

4. The method of claim 3, wherein the method further includes:
    selecting a subset of the modeled users as secondary users;
    estimating from the equalized received data a contribution to the raw received data by the secondary users; and
    subtracting the secondary user contribution from the raw received data to obtain modified received data.

5. The method of claim 4, wherein the subset of modeled users is selected based on an estimated post-combined Signal to Interference and Noise Ratio ("SINR") of the equalized received data.

6. The method of claim 4, wherein the subset of modeled users is selected based on an estimated outage capacity of the equalized received data.

7. The method of claim 4, wherein the subset of modeled users is selected based on an estimated multiuser efficiency of the equalized received data.

8. The method of claim 4, further comprising repeating the steps of selecting modeled users, subtracting, forming, whitening, equalizing, selecting a subset, estimating, and subtracting in a loop until a pre-defined number of loop repetitions is reached, each iteration of the loop being applied to the modified received data obtained by a preceding loop.

9. The method of claim 8, wherein the modeled users are selected from the training data in the first loop, and from the modified received data in at least one subsequent loop.

10. The method of claim 1, wherein the training signals are SRS signals.

11. The method of claim 1, wherein the training signals are DMRS signals.

12. The method of claim 1, further comprising detecting a plurality of user data streams from the received data.

13. The method of claim 12, wherein the plurality of user data streams is detected using an algorithm that incorporates at least one of:
    linear multiuser detection;
    linear Minimum Mean Square Error ("MMSE");
    Zero Forcing;
    non-linear MMSE;
    successive interference cancellation;
    parallel interference cancellation; and
    approximate maximum likelihood detection.

14. The method of claim 1, wherein the selection metric includes at least one of:
    highest post-combined SINR;
    outage capacity; and
    multiuser efficiency.

15. The method of claim 1, wherein the covariance matrix is a space-frequency covariance matrix.

16. The method of claim 1, wherein the covariance matrix is a space-time covariance matrix.

17. The method of claim 1, wherein whitening the raw received data using the interference rejection covariance matrix includes reshaping an effective composite channel covariance matrix to an upper triangular structure suitable for backward-forward type approximate maximum-likelihood detection.

18. The method of claim 1, wherein subtracting the modeled user contribution from the raw received data includes subtracting from the raw received data a contribution corresponding to an estimated average signal power of a data part of a signal received from at least one user that is not a secondary user.

19. A system for applying a multi-path, maximum SINR, pre-processing interference rejection filter to an interference-limited signal received from a plurality of users in a wireless network operating according to the Long Term Evolution ("LTE") standard, the system comprising:
    a signal receiving unit configured to receive raw data corresponding to transmission of signals from the plurality of users, said raw received data including training data corresponding to transmission of training signals from the plurality of users; and
    a signal processing unit configured to select a modeled user according to a selection metric, subtract a contribution of the modeled user from the training data to form a residual training signal, form an interference rejection covariance matrix from the residual training signal, whiten the raw received data using the interference rejection covariance matrix to obtain whitened received data, and equalize the whitened received data to obtain equalized received data.

20. The system of claim 19, wherein said residual training signal includes a non-Gaussian contribution from at least one user that is not a modeled user.

21. The system of claim 19, wherein the signal processing unit is configured to select a plurality of modeled users.

22. The system of claim 21, wherein the signal processing unit is further configured to:
    select a subset of the modeled users as secondary users;

estimate from the equalized received data a contribution to the raw received data by the secondary users; and subtract the secondary user contribution from the raw received data to obtain modified received data.

23. The system of claim 22, wherein the signal processing unit is configured to select the subset of modeled users based on an estimated post-combined Signal to Interference and Noise Ratio ("SINR") of the equalized received data.

24. The system of claim 22, wherein the signal processing unit is configured to select the subset of modeled users based on an estimated outage capacity of the equalized received data.

25. The system of claim 22, wherein the signal processing unit is configured to select the subset of modeled users based on an estimated multiuser efficiency of the equalized received data.

26. The system of claim 22, wherein the signal processing unit is configured to repeat the steps of selecting modeled users, subtracting, forming, whitening, equalizing, selecting a subset, estimating, and subtracting in a loop until a pre-defined number of loop repetitions is reached, each iteration of the loop being applied to the modified received data obtained by a preceding loop.

27. The system of claim 26, wherein the signal processing unit is configured to select the modeled users from the training data in the first loop, and from the modified received data in at least one subsequent loop.

28. The system of claim 19, wherein the training signals are SRS signals.

29. The system of claim 19, wherein the training signals are DMRS signals.

30. The system of claim 19, wherein the signal processing unit is configured to detect a plurality of user data streams from the received data.

31. The system of claim 30, wherein the signal processing unit is configured to detect the plurality of user data streams using an algorithm that incorporates at least one of:
 linear multiuser detection;
 linear Minimum Mean Square Error ("MMSE");
 Zero Forcing;
 non-linear MMSE;
 successive interference cancellation;
 parallel interference cancellation; and
 approximate maximum likelihood detection.

32. The system of claim 19, wherein the selection metric includes at least one of:
 highest post-combined SINR;
 outage capacity; and
 multiuser efficiency.

33. The system of claim 19, wherein the covariance matrix is a space-frequency covariance matrix.

34. The system of claim 19, wherein the covariance matrix is a space-time covariance matrix.

35. The system of claim 19, wherein whitening the raw received data using the interference rejection covariance matrix includes reshaping an effective composite channel covariance matrix to an upper triangular structure suitable for backward-forward type approximate maximum-likelihood detection.

36. The system of claim 19, wherein subtracting the modeled user contribution from the raw received data includes subtracting from the raw received data a contribution corresponding to an estimated average signal power of a data part of a signal received from at least one user that is not a secondary user.

37. A non-transitory computer readable medium storing a computer program, executable by a machine, for applying a multi-path, maximum SINR, pre-processing interference rejection filter to an interference-limited signal received from a plurality of users in a wireless network operating according to the Long Term Evolution ("LTE") standard, the computer program comprising executable instructions for:
 receiving raw data corresponding to transmission of signals from the plurality of users, said raw received data including training data corresponding to transmission of training signals from the plurality of users;
 selecting a modeled user according to a selection metric;
 subtracting a contribution of the modeled user from the training data to form a residual training signal;
 forming an interference rejection covariance matrix from the residual training signal;
 whitening the raw received data using the interference rejection covariance matrix to obtain whitened received data; and
 equalizing the whitened received data to obtain equalized received data.

* * * * *